INVENTOR
Robert W. Osgood
ATTORNEYS

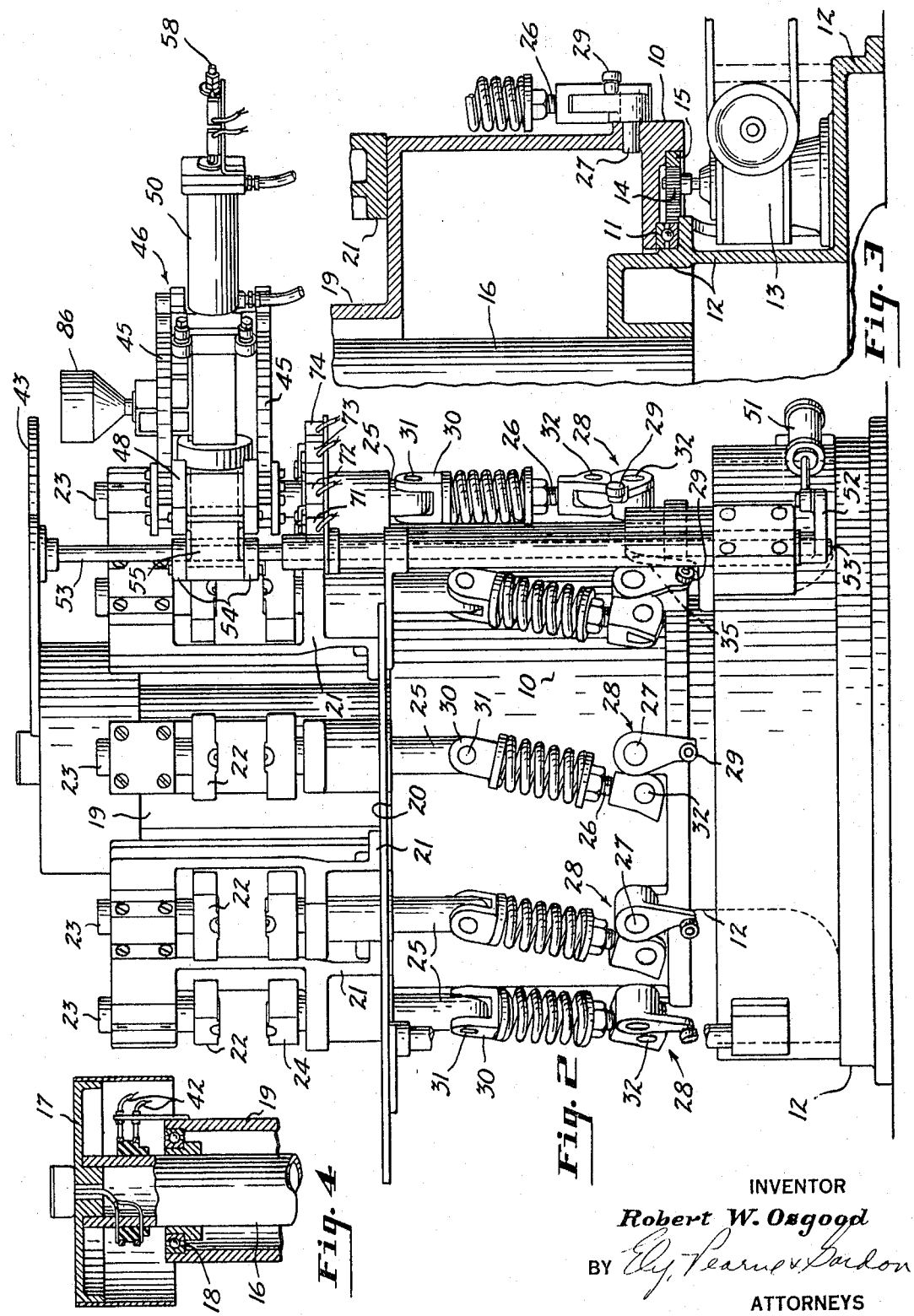

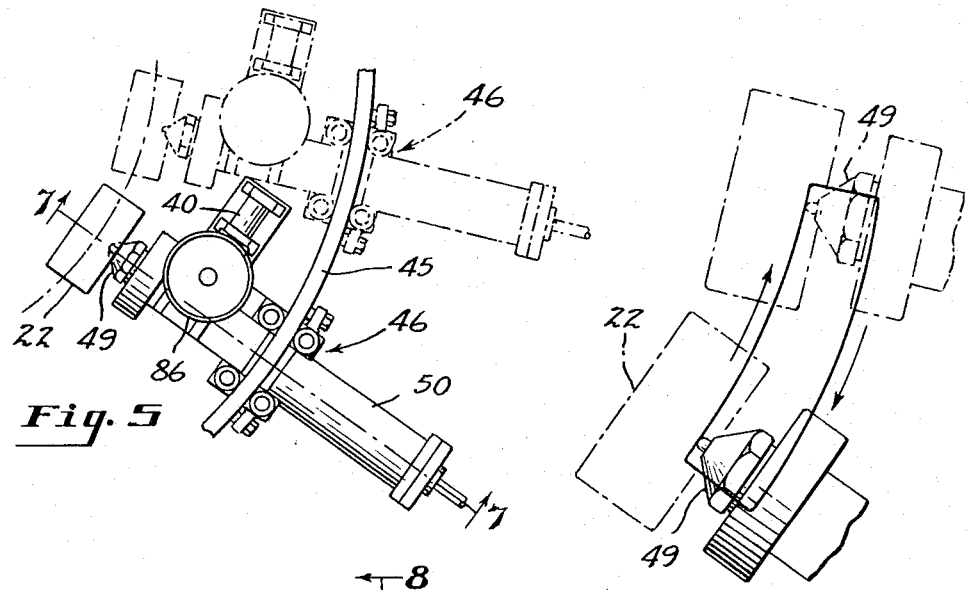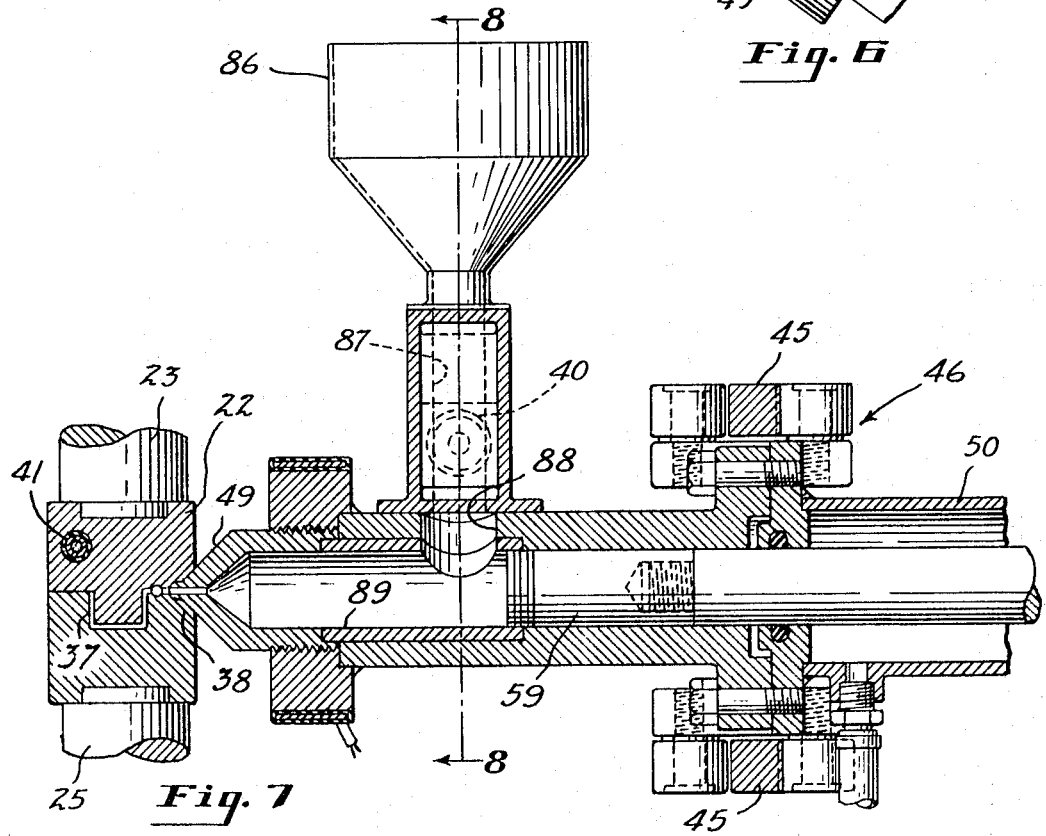

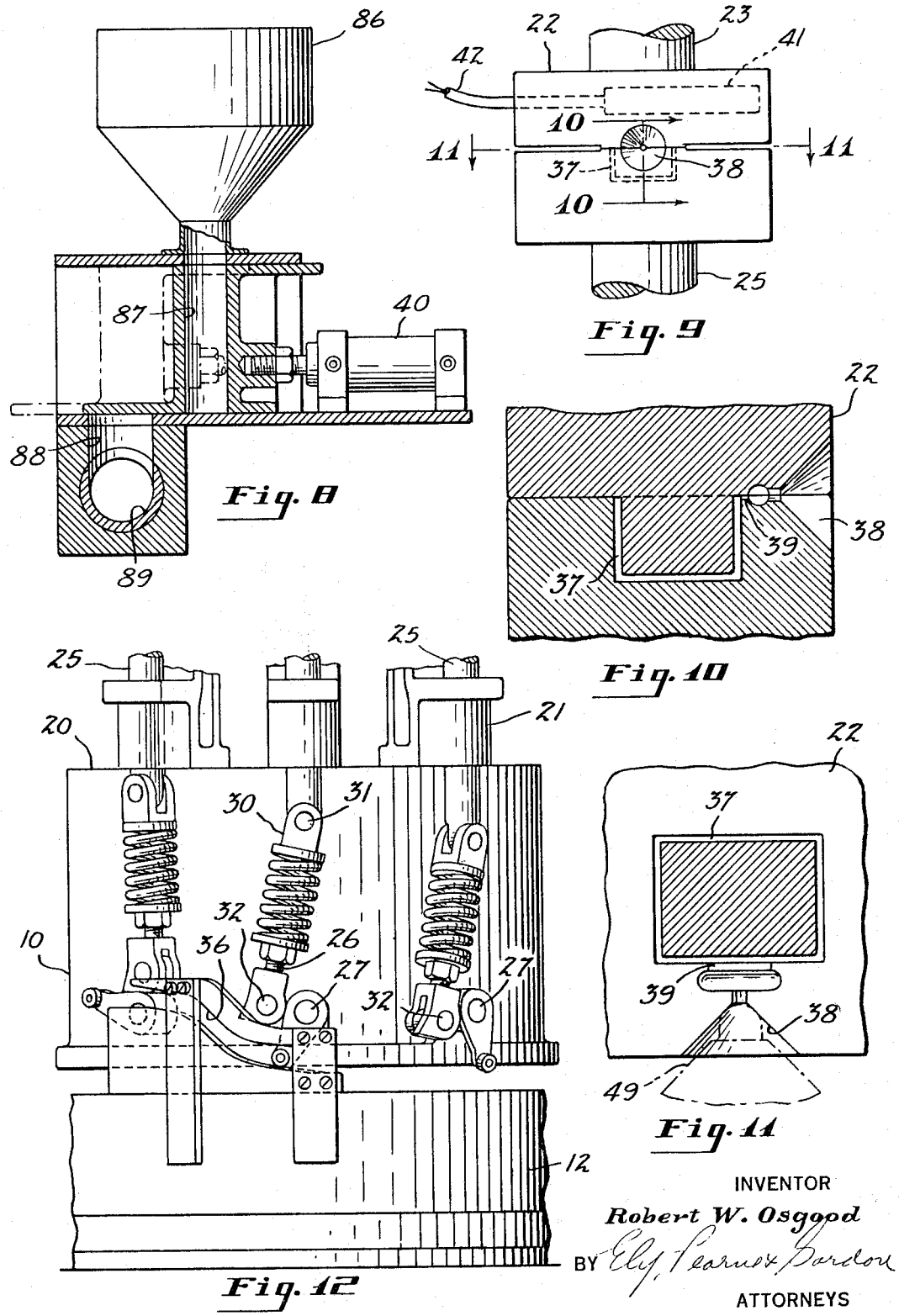

Dec. 27, 1966  R. W. OSGOOD  3,293,691
ROTARY TRANSFER INJECTION MOLDING MACHINE
Filed May 15, 1964  5 Sheets-Sheet 5

INVENTOR
Robert W. Osgood
BY
ATTORNEYS

United States Patent Office 3,293,691
Patented Dec. 27, 1966

3,293,691
ROTARY TRANSFER INJECTION MOLDING MACHINE
Robert W. Osgood, Warren, Pa., assignor to El-Tronics, Inc., Warren, Pa., a corporation of Pennsylvania
Filed May 15, 1964, Ser. No. 367,712
4 Claims. (Cl. 18—20)

This invention relates to improvements in transfer molding means for molding articles from plastic materials, and particularly to transfer molding means employed with turret-type apparatus of the continuously (non-intermittently) rotating type. The invention relates to injection molding apparatus in which the charge is pressurized within the mold by being injected into the molding under pressure, as distinguished from compression molding in which the mold halves are moved together to compress the charge and thereby pressurize it within the mold.

Constantly rotating apparatus of the turret type is preferred over intermittently rotating apparatus because of substantial savings in both initial cost and operating cost. Equipment which must be intermittently translated from one dwell position to the next is subjected to inertia loads that require a heavy and rugged design. Power consumption is relatively high and wear is relatively great. The drive must comprise either a complicated and costly mechanical arrangement, such as a Geneva drive, or sophisticated and expensive electrical, hydraulic, or pneumatic drive systems.

Constantly rotating turrets avoid all these disadvantages. A large turntable array of molds and the like may be driven through their endless cycle by a simple power train originating at an electric motor or the like which turns at a constant speed.

The advantages of turret apparatus of the constantly rotating type over turret apparatus of the intermittently advanced type has naturally prompted the use of the former when particular applications allow it. However, continuously rotating turret type mold arrays have not been successfully utilized in the automatic pressure injection molding of thermosetting plastics and certain other plastics such as granular polyester molding compounds which cannot be successfully stored in large quantities within a heated extrusion cylinder, and suggestions of the prior art for automatic pressure injection molding of materials of these types have contemplated the employment of intermittent or dial type feeds for feeding a succession of molds past an extruder and allowing each of them to dwell below the extruder during filling of the mold and for an additional period of time during which extrusion pressure continues to be applied to the mold (see, for example, U.S. Patent 2,738,551, and particularly the paragraph in that patent beginning at column 3, line 72).

The present invention provides means whereby a variety of compounds of the thermosetting type may be successfully molded by pressure injection and with molding apparatus of the continuously rotating turret type. As implied from the preceding, other compounds which have not heretofore been successfully moldable by pressure injection in continuously rotating mold arrays may also be used in the practice of the present invention.

The invention contemplates the provision of an extruder that is capable of feeding and maintaining feeding pressure on constantly moving mold units without interruption of constant rotary motion of the mold turret or table, together with an arrangement such that each increment of the molding charge experiences only a relatively brief sojourn within the extruder. The feeder includes an extruder cylinder that (1) has a displacement not exceeding a low (say 10, or in unusual cases 25) multiple of the volume-capacity of each of the molding units of the turret and (2) is arranged to feed the mold on the fly, and to recharge itself, all as more fully described below.

Other objects and advantages of the invention will be more fully understood and appreciated from a consideration of the following description and the accompanying drawings.

In the drawings:

FIGURE 2 is a side elevation of the apparatus seen in FIGURE 1.

FIGURE 3 is a fragmentary cross-section showing a portion of the turret driving mechanism of the apparatus.

FIGURE 4 is a fragmentary cross-sectional detail of the apparatus.

FIGURE 5 is a plan view of a station of the apparatus, certain parts being shown in alternate positions.

FIGURE 6 is an enlargement of a portion of FIGURE 5, and also shows the closed endless path of the discharge tip of the extruding cylinder of the illustrated apparatus.

FIGURE 7 is a view taken from line 7—7 in FIGURE 5.

FIGURE 8 is a view taken from line 8—8 in FIGURE 7.

FIGURE 9 is a view of one of the mold assemblies of the apparatus.

FIGURE 10 is a fragmentary section taken from line 10—10 in FIGURE 9.

FIGURE 11 is a fragmentary section taken from the line 11—11 in FIGURE 9.

FIGURE 12 is a fragmentary elevational view of a portion of the apparatus not seen in FIGURE 2.

Figure 1:
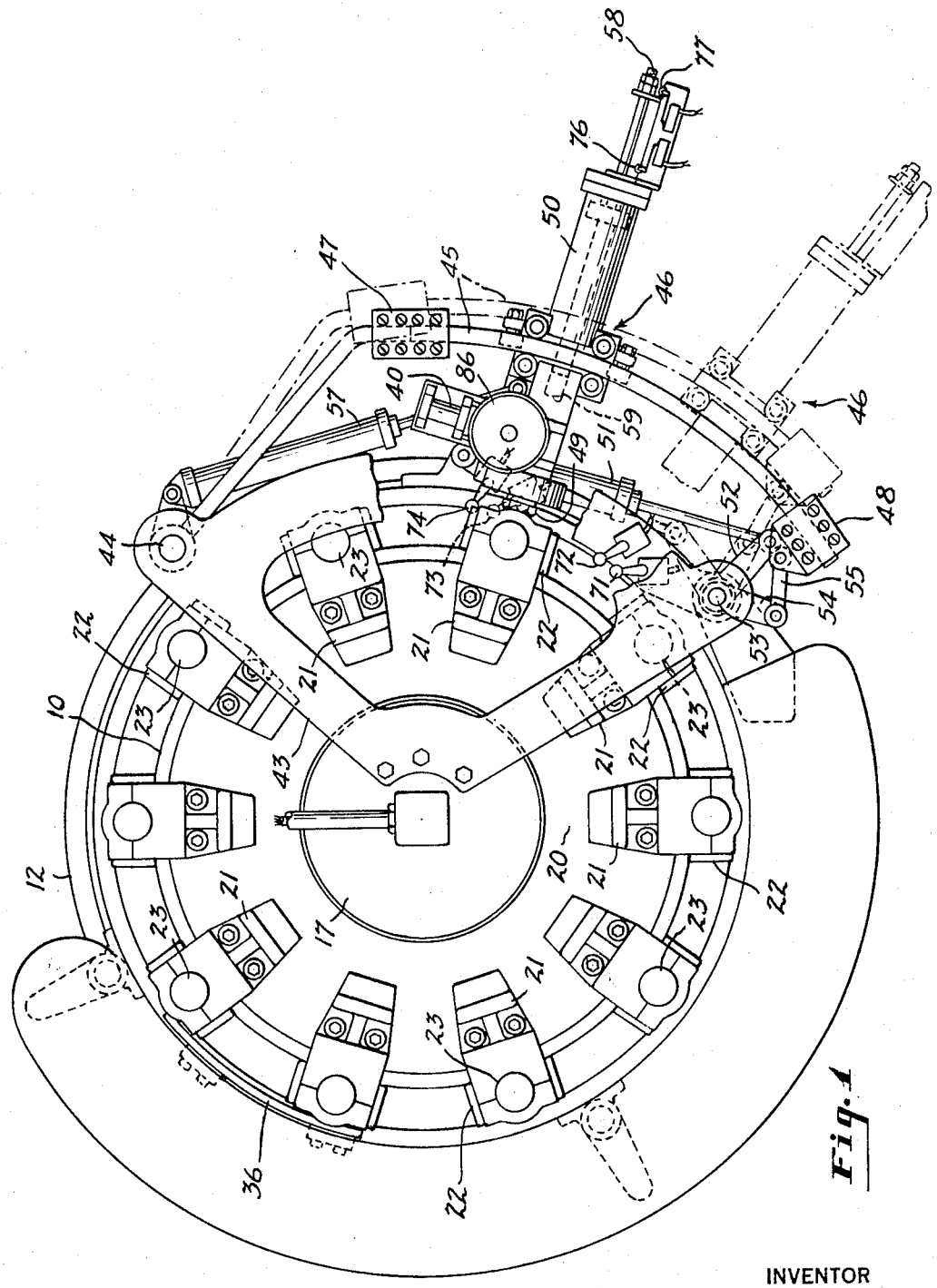
FIGURE 1 is a plan view of apparatus exemplifying the invention.

The numbers included in parentheses in the following description refer to the figure numbers of the drawings in which the part being described is best seen.

In the illustrated apparatus a rotating base 10 (1–3) is rotatably supported by a bearing 11 (3) on a stationary pedestal 12. The rotating base 10 is provided with a ring gear 15 (3) which is engaged by a spur gear 14 at the output side of an adjustable speed reducer 13 powered by a suitable drive motor (not shown). A stationary central post 16 (4) extends upwardly from the pedestal.

The top portions of the rotating base 10 form a rotating table 20 (1, 2, 12) above which extends a central collar 19 (4) that is rotatably supported on the post 16 by the bearing 18. The post 16 supports a stationary top plate 17 (1, 4) to which is bolted a top frame member 43 (1, 2). Ten mold support stands 21 (1–3, 12) are carried on the top of the rotating table 20. The mold support stands project over the side edge of the rotating table 20 and carry the mold sections. The upper mold sections 22 (2, 5–7, 9–11) are directly carried by upper mold section mounting shafts 23 (1, 2, 9) which are clamped to the top portions of the mold support stands 21.

The lower mold sections 24 are supported on lower mold section mounting shafts 25 (2, 9, 12) which are slidingly mounted and guided in the lower portions of the mold support stands 21 for vertical reciprocating movement between mold-opened and mold-closed conditions. The shafts 25 are actuated by the rods 26 (2, 3, 12), the upper ends of which are slidingly mounted within the lower ends of the yokes 30. The yokes 30 are pivotally pinned to the lower ends of the mounting shafts 25.

Heavy springs that surround the rods 26 are engaged against collars associated with the rods 26 and yokes 30 in such a way as to tend to maximize the combined lengths of the yoke and rod between the pivot points 31 and 32 (2, 12) but the total amount of this expansion is limited by suitable end-stop engagement means (not shown) within the yoke 30 and at the portion of the rod 26 received within the yoke.

The details of this arrangement may be seen in U.S. Patent No. 2,440,366. They are immaterial to the present invention, and any suitable mold closing and clamping arrangement may be employed. However, they are here illustrated and described because they are the preferred means for closing the molds, maintaining them closed under adequate clamping pressure, and then reopening them. The bellcrank linkages 28 are carried on pins 27 (2, 3, 12), which in turn are carried by the rotating base 10. The cam followers 29 engage a raising cam 35 (2) and thereby raise the pivot point 32, the rod 26, the shaft 25, and the lower mold section 24. As the pivot point 32 passes between the pivot points 31 and 27, the tendency of the pivot points 31 and 32 to move apart under the bias of the spring causes a snap action to occur, maintaining the mold in raised or closed position under the bias of the heavy spring, and also maintaining the cam follower 29 in a raised position until the follower engages a lowering cam 36 at a much later stage in the cycle of operation.

The upper and lower mold sections 22 and 24, when closed, define a mold cavity 37 (10), a sprue 38 (7, 9–11), and a wide, shallow gate 39 (10, 11), or equivalent, between the sprue and the mold cavity.

The molding units may be heated by suitable means, such as heater cartridges 41 (7), supplied with electric power by power lines 42 (4, 9) leading from suitable distributor rings at the top center of the turntable structure.

A pair of rails 45 (1, 2, 5, 7) is pivoted at 44 (1) on a vertical post supported at its top end by the frame member 43. The pair of rails 45 springs around this pivot point in a horizontal plane between the two positions illustrated in FIGURE 1. The rails always move bodily with each other and they are fastened together in spaced relationship by the members 47 and 48 (1). A carriage 46 (1, 2, 5, 7) is translatable along the rails 45 between the members 47 and 48. The carriage carries an extruding cylinder having a discharge orifice at its discharge end 49 (1, 5–7, 11). The discharge end of the cylinder is surrounded by a heating head or collar as shown in FIGURE 7.

The shifting of the rails 45 about the pivot point 44 is controlled by an actuating cylinder 51 (1, 2) that operates through a lever 52 to turn a shaft 53 which is supported for oscillation on the pedestal 12 and frame member 43. A pair of arms 54 keyed to the shaft 53 drives the wide link 55, which in turn is pivoted to the member 48.

A pneumatic actuating cylinder 57 (1) is linked to the carriage 46, driving the carriage in return movement along the rails 45 from the solid-line position shown in FIGURE 1 to the position shown in dotted lines in FIGURE 1.

With the carriage and extrusion cylinder in the solid-line position shown in FIGURE 1, retraction of the cylinder 51 will pivot the rails 45 inwardly toward the rotating turret and will clamp the discharge end 49 of the extrusion cylinder into one of the passing sprues 38. This, of course, requires proper synchronizing, and this may be achieved in any suitable manner, as by provision of a microswitch for sensing when a passing mold reaches proper position and thereupon, through a relay-controlled solenoid-actuated valve, valving a fast-acting hydraulic circuit to retract cylinder 51. Similar control arrangements may be provided for other steps in the operating cycle of the apparatus. One arrangement is shown schematically in FIGURES 13 and 14.

Figure 14:
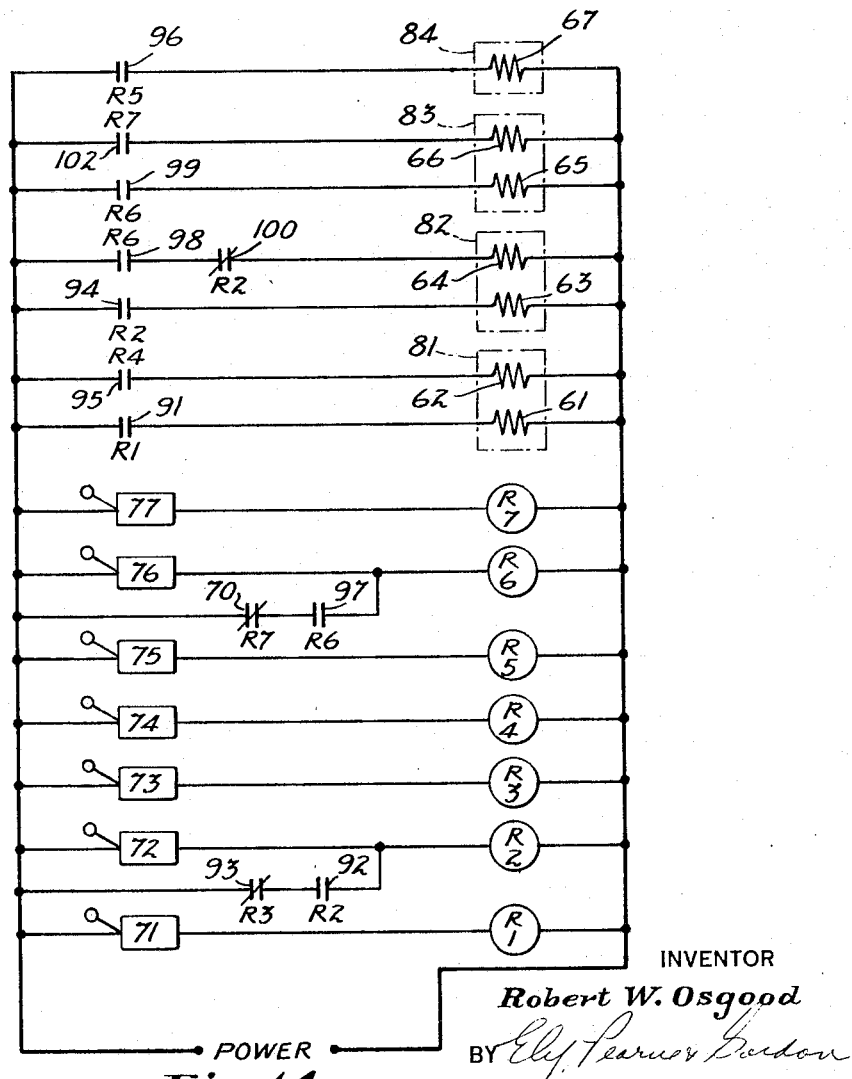
FIGURE 14 is a diagrammatic view of a micro-switch and relay control system for the solenoid-operated valves.

Shown in FIGURE 14 are a series of microswitches 71–77. (All but microswitch 75 are also seen in FIGURE 1.) When these microswitches are closed, they respectively energize the relays R–1 to R–7. The microswitches 71–74 inclusive are momentarily closed in sequence as each molding unit passes the extruding station. The microswitch 75 is closed only when the rails 45 are in their outward position, as shown in dotted lines in FIGURE 1. The microswitch 76 is closed when the shaft 58 (1, 2) associated with the extruder cylinder reaches a given point corresponding to a certain measure of extruder exhaustion, but this closing of microswitch 76 occurs sufficiently short of a full advance position of the extruder that the extruder will not be exhausted after the microswitch 76 is closed but before an associated mold is completely filled. The microswitch 77 is closed when the shaft 58 is fully retracted to the position shown in FIGURE 1, which corresponds to the fully retracted position of the extruder plunger 59 (7).

Figure 13:
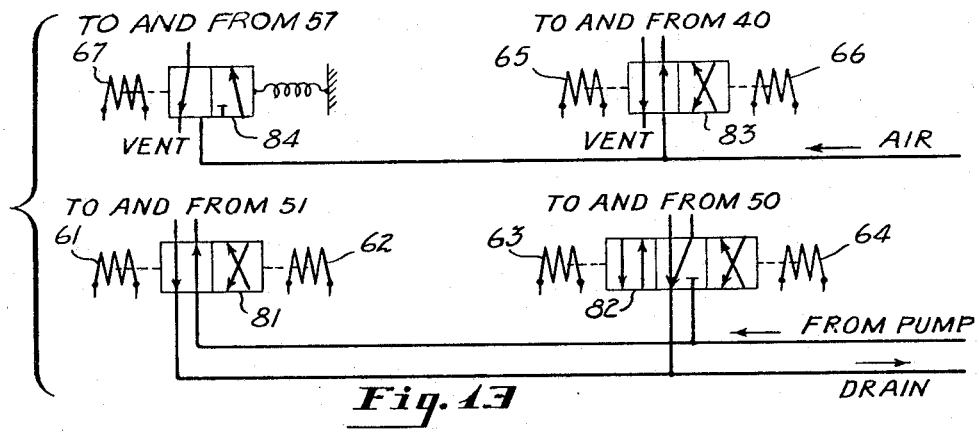
FIGURE 13 is a schematic view of hydraulic and pneumatic valving arrangements for solenoid-controlled valves which may be employed in the illustrated example of the invention.

The solenoids 61–67 shown in FIGURES 13 and 14 are associated with the solenoid-operated hydraulic or pneumatic valves 81–84 that are indicated diagrammatically in FIGURE 14 and schematically in FIGURE 13.

The valve 81 has two positions for reversing the pressure and drain connections of the ends of the cylinder 51, which moves the rails 45 in and out. The valve 82 has two end positions for reversing the pressure and drain connections of the extruder actuating cylinder 50 (1, 2, 5, 7), but when neither of the associated solenoids 63 and 64 is energized, the valve 82 is self-centering, as by springs, so that the porting connections are as shown in FIGURE 13, i.e., the extruding cylinder 50 is relieved of pressure and is not hydraulically forced in either direction.

The valve 83 may be a pneumatic valve similar in its porting arrangements to the hydraulic valve 81. The valve 83 controls a pneumatic cylinder 40 (1, 8) for actuating a feeder for the extruding cylinder.

The valve 84 may be spring-urged to a position where the chamber of the associated pneumatic cylinder 57 is vented to atmosphere. The opposite position of the valve 84 ports the pneumatic cylinder 57 to the pressure source, thereby extending the cylinder 57 and providing return movement of the carriage 46.

The charge of molding compound may be fed from a hopper 86 (1, 2, 5, 7, 8) to a feed drawer 87 (8). The feed drawer 87 is reciprocated by the cylinder 40 and at its other position is located over the infeed mouth 88 (7, 8) of the extrusion chamber 89.

The cycle of operation for injection molding of a single passing mold is as follows. As the mold approaches the microswitch 71, the rails 45 are in their withdrawn or dotted-line position, shown in FIGURE 1. As the microswitch 71 is closed, energizing the relay R–1 and closing the switch 91 associated with R–1, the solenoid 61 is energized, thereby porting the cylinder 51 in such a way as to retract it and, through the linkage 52–54, shift the rails 45 to the solid-line position shown in FIGURE 1 and establish and maintain the discharge end 49 of the extruding cylinder in clamped relationship against the associated sprue 38. Shortly thereafter, the passing mold engages the microswitch 72, thereby energizing the relay R–2, which is provided with a holding switch 92, so that the relay R–2 remains energized after the mold passes out of contact with the microswitch 72 and until such time as the normally closed switch 93 is opened. The relay R–2 closes the switch 94, thereby energizing the solenoid 63 and shifting the valve 82 to the position that applies pressure to the extruding cylinder in the extruding direction. The mold is quickly filled and the filled mold then continues to be subjected to extrusion pressure as the mold moves away from microswitch 72 and to microswitch 73.

While switch 92 continues to hold, extruding pressure continues to be applied until the passing mold engages the microswitch 73, at which time the switch 93 opens, causing relay R–2 to drop out, thereby de-energizing relay R–2 and opening holding switch 92, and also opening switch 94 and de-energizing solenoid 63 to allow the valve 82 to return to its neutral position and relieve the extruding cylinder from extruding pressure. Shortly thereafter, the passing mold closes the microswitch 74, momentarily energizing the relay R–4 and closing the switch 95 to thereby energize the solenoid 62 and reverse the position of the valve 81. This causes the cylinder 51 to extend and shift the track outwardly to the dotted-line position shown in FIGURE 1. As the track reaches its outward position, it closes the microswitch 75, energizing the relay R–5 and closing the associated switch 96 to energize the solenoid 67 and shift the valve 84 so as to port the cylinder 57 for return movement of the carriage 46.

It is to be noted that the advancing movement of the carriage 46 is accomplished by the driving engagement between the mold sprue 38 and the discharge end 49 of the extrusion cylinder, with the sprue being the driving member. Thus, synchronism between the motion of the passing mold and of the extruding cylinder during the extruding operation is accomplished in a very simple manner.

Return of the carriage toward the end of the rails 45 associated with the member 48 completes the operating cycle and the apparatus is ready to repeat the cycle in association with the next succeeding mold.

When the extruder plunger 59 is sufficiently fully advanced, an element on the associated shaft 58 closes the microswitch 76, energizing the relay R–6 and closing the holding switch 97 and also the switches 98 and 99 associated with the relay R–6. If the extruder is in the middle of its arcuate path of advance, the injection operation continues even after closing of the microswitch 76. This is true because the relay R–2 remains energized at this stage and therefore normally closed switch 100, which is associated with the relay R–2, remains open. As soon, however, as the relay R–2 drops out, as upon momentary closure of the microswitch 73, the switch 100 closes, thereby energizing the solenoid 64, and thereby moving the valve 82 to port the extrusion cylinder 50 for return movement.

As the extruding cylinder 50 returns to its fully retracted position, the microswitch 77 is closed, thereby energizing the relay R–7. This opens the associated normally closed switch 70, thereby allowing the relay R–6 to drop out.

Meanwhile, energizing of the relay R–6 has, by closing the switch 99, energized the solenoid 65 to move the valve 83 to a position where the cylinder 40 is retracted so that the drawer 87 moves into the hopper 86. Then, when the relay R–7 is energized, the associated switch 102 is closed to energize the solenoid 66 and thereby reverse the porting of the valve 83 to cause the feed drawer 87 to advance over the infeed mouth 88 and deliver a new charge of molding material to the extrusion chamber 89.

It is to be noted that the retraction of the extruding cylinder and the recharging operation occurs on demand after the extruding cylinder charge has been sufficiently depleted. This occurs not less frequently than after a low multiple of injecting operations. It may occur as frequently as every injecting operation. In this respect, it may be observed that the apparently high ratio between the volume of the extruding chamber and the volume of the mold cavity in FIGURE 7 is exaggerated because of the deceptively small area of the particular region of the mold cavity that is within the plane of the section shown in FIGURE 7, and that this ratio is actually low enough so that the chamber 89 is depleted after each low multiple of injecting operations.

The invention is not restricted to the slavish imitation of each and every one of the details described above which have been set forth merely by way of example with the intent of most clearly setting forth the teaching of the invention. Obviously devices may be provided which change, eliminate or add certain specific structural details without departing from the invention.

What is claimed is:

1. In a molding machine having a turret rotatable at a constant rate, a plurality of molding units carried by the turret, each of the molding units comprising relatively movable cooperative elements defining therebetween a sprue, said sprue communicating with mold-cavity spaces defined between the mold elements, a fly feeder for the succession of sprues of the molding units, said fly feeder comprising an extrusion cylinder having a discharge orifice facing said succession of sprues and having a stroke displacement not exceeding a low multiple of the volume-capacity of each of the molding units, means mounting said extrusion cylinder for movement along an arc having the same center as said turret, means synchronized with the turning of said turret for shifting said cylinder to clamp its discharge orifice against each passing sprue and to thereafter release said clamping engagement after travel of the cylinder along said arc in synchronism with the passing sprue, said cylinder and each passing sprue being arcuately movable as a unitary assembly while maintaining said clamping engagement, injection means for performing injection operations by commencing and then terminating the application of extrusion pressure to said cylinder during successive clamping engagements and arcuate movements of said orifice together with successively passing sprues, and means for demand refilling of said cylinder when it approaches exhaustion.

2. Apparatus as defined in claim 1 in which said last named means includes means for automatically recharging said cylinder after those of such injection operations that terminate leaving the remaining cylinder charge at less than a predetermined volume.

3. Apparatus as defined in claim 2 in which said extrusion cylinder mounting means includes arcuate track means and means for guiding said cylinder along said track, said track being bodily shiftable between a first position at which the discharge orifice of said cylinder is removed from the path of passing sprues and a second position at which the discharge orifice of said cylinder is extended to the path of passing sprues to be engageable with such sprues and drivable in the forward direction along said track by and in synchronism with said turret during such engagement, and means for returning said cylinder between such engagements.

4. In a molding machine having a turret rotatable at a constant rate, a plurality of molding units carried by the turret, each of the molding units comprising relatively movable cooperative elements defining therebetween a sprue, said sprue communicating with mold-cavity spaces defined between the mold elements, a fly feeder for the succession of sprues of the molding units, said fly feeder comprising an extrusion cylinder having a discharge orifice facing said succession of sprues and having a stroke displacement not exceeding a low multiple of the volume-capacity of each of the molding units, means mounting said extrusion cylinder for movement along an arc having the same center as said turret, means synchronized with the turning of said turret for shifting said cylinder to clamp its discharge orifice against each passing sprue and to thereafter release said clamping engagement after travel of the cylinder along said arc in synchronism with the passing sprue, said cylinder and each passing sprue being arcuately movable as a unitary assembly while maintaining said clamping engagement, injection means for performing injection operations by commencing and then terminating the application of extrusion pressure to said cylinder during successive clamping engagements and arcuate movements of said orifice together with successively passing sprues, and means for demand refilling of said cylinder when it approaches exhaustion, said extrusion cylinder mounting means including arcuate track means and means for guiding said cylinder along said track, said track being bodily shiftable between a first position at which the discharge orifice of said cylinder is removed from the path of passing sprues and a second position at which the discharge orifice of said cylinder is extended to the path of passing sprues to be engageable with such sprues and drivable in the forward direction along said track by and in synchronism with said turret during such engagement, and means for returning said cylinder between such engagements.

References Cited by the Examiner

UNITED STATES PATENTS

| | | | |
|---|---|---|---|
| 2,858,564 | 11/1958 | Sherman et al. | 18—20 X |
| 3,066,353 | 12/1962 | Mark et al. | 18—20 |
| 3,134,137 | 5/1964 | Immel | 18—30 |

J. SPENCER OVERHOLSER, *Primary Examiner.*

W. L. McBAY, *Assistant Examiner.*